US011521349B2

(12) United States Patent
Caputo et al.

(10) Patent No.: US 11,521,349 B2
(45) Date of Patent: Dec. 6, 2022

(54) VIRTUAL REALITY SYSTEM FOR VIEWING POINT CLOUD VOLUMES WHILE MAINTAINING A HIGH POINT CLOUD GRAPHICAL RESOLUTION

(71) Applicant: FARO Technologies, Inc., Lake Mary, FL (US)

(72) Inventors: Manuel Caputo, Schwieberdingen (DE); Louis Bergmann, Stuttgart (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 547 days.

(21) Appl. No.: 16/126,099

(22) Filed: Sep. 10, 2018

(65) Prior Publication Data

US 2019/0088007 A1     Mar. 21, 2019

Related U.S. Application Data

(60) Provisional application No. 62/561,363, filed on Sep. 21, 2017.

(51) Int. Cl.
*G06T 15/40* (2011.01)
*G06T 15/00* (2011.01)

(52) U.S. Cl.
CPC .............. *G06T 15/40* (2013.01); *G06T 15/00* (2013.01); *G06T 15/005* (2013.01); *G06T 2210/36* (2013.01)

(58) Field of Classification Search
None
See application file for complete search history.

(56) References Cited

U.S. PATENT DOCUMENTS

| | | | |
|---|---|---|---|
| 8,705,012 B2 | 4/2014 | Greiner et al. | |
| 9,342,920 B1* | 5/2016 | McKenzie | G06T 15/08 |
| 2012/0105473 A1* | 5/2012 | Bar-Zeev | G06T 1/20 |
| | | | 345/633 |
| 2013/0300740 A1 | 11/2013 | Snyder et al. | |
| 2017/0109935 A1* | 4/2017 | Löffler et al. | G06F 3/011 |
| 2017/0243319 A1* | 8/2017 | Wittenbrink | G06F 3/147 |

(Continued)

OTHER PUBLICATIONS

FARO VR Generator—Tuturial—YouTube Retreived from Internet: URL:https://www.youtube.com/watch?v=talflTXh2_ l[retreived Jun. 21, 2018].

(Continued)

*Primary Examiner* — Hilina K Demeter
(74) *Attorney, Agent, or Firm* — Cantor Colburn LLP

(57) ABSTRACT

A virtual reality (VR) system that includes a three-dimensional (3D) point cloud having a plurality of points, a VR viewer having a current position, a graphics processing unit (GPU), and a central processing unit (CPU). The CPU determines a field-of-view (FOV) based at least in part on the current position of the VR viewer, selects, using occlusion culling, a subset of the points based at least in part on the FOV, and provides them to the GPU. The GPU receives the subset of the plurality of points from the CPU and renders an image for display on the VR viewer based at least in part on the received subset of the plurality of points. The selecting a subset of the plurality of points is at a first frame per second (FPS) rate and the rendering is at a second FPS rate that is faster than the first FPS rate.

20 Claims, 10 Drawing Sheets

(56) References Cited

U.S. PATENT DOCUMENTS

2017/0244951 A1 8/2017 Ha et al.
2017/0365086 A1* 12/2017 Floyd .................... G06T 15/405

OTHER PUBLICATIONS

Zeiss, G., "Underground 3D utility mapping: A vision for the future"—SPAR 3D—Aug. 23, 2017 (pp. 1-6) URL: https://www.spar3d.com/blogs/guest-blog/underground-utility-detection-tech-vision-future . . . [retrieved on Jun. 21, 2018].
Extended European Search Report for Application No. 18195482.7-1208, dated Jan. 18, 2019, 9 pages.

* cited by examiner

VIRTUAL REALITY SYSTEM FOR VIEWING POINT CLOUD VOLUMES WHILE MAINTAINING A HIGH POINT CLOUD GRAPHICAL RESOLUTION

CROSS REFERENCE TO RELATED APPLICATIONS

This application claims the benefit of U.S. Provisional Application Ser. No. 62/561,363, filed Sep. 21, 2017, the entire disclosure of which is incorporated herein by reference.

BACKGROUND

The subject matter described herein relates in general to virtual reality, and in particular to a virtual reality system for viewing point cloud volumes while maintaining a high point cloud graphical resolution.

Metrology devices, such as a 3D laser scanner time-of-flight (TOF) coordinate measurement devices for example, may be used to generate three-dimensional (3D) representations of areas, such as buildings for example. A 3D laser scanner of this type steers a beam of light to a non-cooperative target such as a diffusely scattering surface of an object. A distance meter in the device measures a distance to the object, and angular encoders measure the angles of rotation of two axes in the device. The measured distance and two angles enable a processor in the device to determine the 3D coordinates of the target.

A TOF laser scanner is a scanner in which the distance to a target point is determined based on the speed of light in air between the scanner and a target point. Laser scanners are typically used for scanning closed or open spaces such as interior areas of buildings, industrial installations and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data, referred to herein as a point cloud (or point cloud data), is collected, stored and sent to a processor or processors to generate a 3D image representing the scanned area or object.

A high frame per second (FPS) rate is desired when rendering point cloud data to a display on a virtual reality (VR) viewer in order to provide a smooth viewing experience for a user of the VR viewer. In contemporary VR systems there is often a tradeoff between the FPS rate and the number of points displayed by the VR viewer. This tradeoff occurs because the FPS rate that a graphics processing unit (GPU) is capable of rendering decreases with the number of points that the GPU has to process in each frame.

Accordingly, while existing VR systems are suitable for their intended purposes, what is needed is a VR system having certain features of embodiments of the present invention.

BRIEF DESCRIPTION

According to an embodiment of the present invention, a virtual reality (VR) system is provided. The VR system includes a three-dimensional (3D) point cloud that includes a plurality of points, a VR viewer having a current position, a graphics processing unit (GPU) coupled to the VR viewer, and a central processing unit (CPU) coupled to the VR viewer. The CPU is responsive to first executable computer instructions that when executed on the CPU perform a first method that includes determining a field-of-view (FOV) based at least in part on the current position of the VR viewer, selecting, using occlusion culling, a subset of the plurality of points based at least in part on the FOV, and providing the subset of the plurality of points to the GPU. The GPU is responsive to second executable computer instructions that when executed on the GPU perform a second method that includes receiving the subset of the plurality of points from the CPU and rendering an image for display on the VR viewer based at least in part on the received subset of the plurality of points. The selecting a subset of the plurality of points is at a first frame per second (FPS) rate and the rendering is at a second FPS rate that is faster than the first FPS rate.

According to an embodiment of the present invention, a method of viewing point cloud volumes while maintaining a high point cloud resolution includes providing a VR system that includes a 3D point cloud that includes a plurality of points, a CPU, a VR viewer having a current position, and a GPU. The GPU and the CPU are coupled to the VR viewer. The CPU determines a FOV based at least in part on the current position of the VR viewer and selects, using occlusion culling, a subset of the plurality of points in the 3D point cloud based at least in part on the FOV. The CPU provides the subset of the plurality of points to the GPU. The GPU receives the subset of the plurality of points from the CPU and renders an image for display on the VR viewer based at least in part on the received plurality of points. The selecting a subset of the plurality of points is at a first FPS rate and the rendering is at a second FPS rate that is faster than the first FPS rate.

According to an embodiment of the present invention, a computer program product for viewing point cloud volumes while maintaining a high point cloud resolution includes a computer readable storage medium having program instructions embodied therewith, the program instructions determining, at a CPU in a VR system, a FOV based at least in part on a current position of a VR viewer and selecting, using occlusion culling, a subset of the plurality of points in the 3D point cloud based at least in part on the FOV. The CPU provides the subset of the plurality of points to the GPU. The GPU receives the subset of the plurality of points from the CPU and renders an image for display on the VR viewer based at least in part on the received plurality of points. The selecting a subset of the plurality of points is at a first FPS rate and the rendering is at a second FPS rate that is faster than the first FPS rate.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
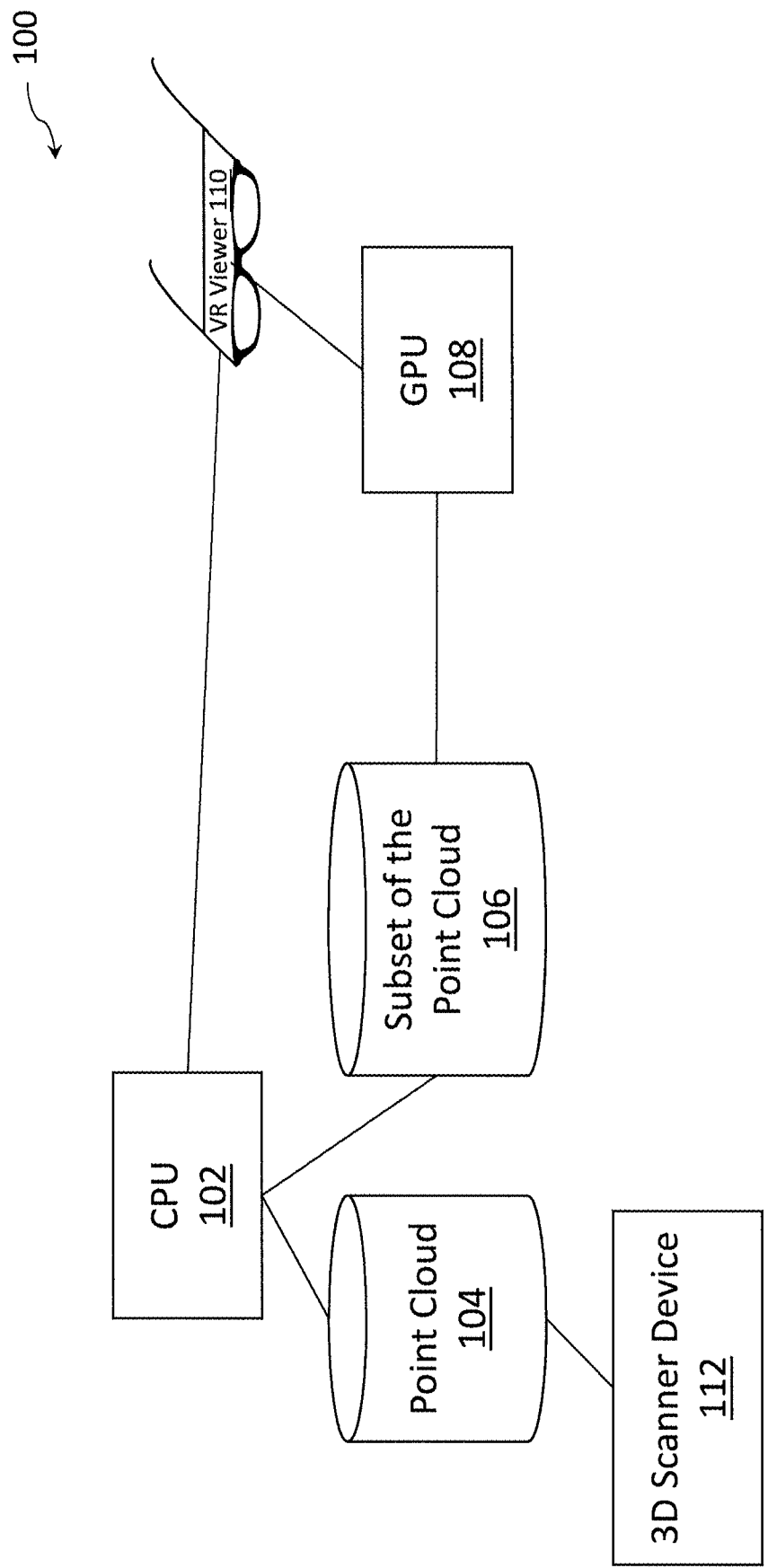
FIG. 1 is an schematic illustration of a virtual reality (VR) system in accordance with one or more embodiments of the present invention.

The detailed description explains embodiments of the invention, together with advantages and features, by way of example with reference to the drawings.

DETAILED DESCRIPTION

Embodiments of the present invention relate to viewing huge point cloud volumes in a virtual reality (VR) viewer. As used herein, the term "huge point cloud volume" refers to a point cloud having billions of points (e.g., twenty billion, forty billion, fifty billion, or more). While it is not uncommon for a point cloud to have over forty billion points, a typical contemporary graphics processing unit (GPU) is cable of rendering roughly twenty million points in a VR scene for display on a VR viewer before the frame per second (FPS) rate drops below an acceptable rate for viewing. In one or more embodiments described herein, a central processing unit (CPU) based rendering engine capable of displaying huge point clouds at one FPS rate is combined with a GPU operating to display a subset of the huge point cloud in a VR viewer. By operating on only a subset of the point cloud at any one point in time, the GPU can operate at a higher FPS rate than the CPU without impacting the resolution of the image displayed on the VR viewer.

In an embodiment, the CPU selects points at a first FPS rate (e.g., ten FPS) for rendering by a GPU on a VR viewer at a second, faster, FPS rate (e.g., ninety FPS). Embodiments of the present invention utilize a CPU based rendering engine that retrieves points from a point cloud database for display by the GPU using occlusion culling and based on a current field-of-view (FOV) of the VR viewer. The subset of points retrieved using the CPU occlusion culling based rendering approach for the current FOV are transferred or streamed onto a GPU which uses them to render an image on the VR viewer at the second FPS rate.

As used herein, the term "occlusion culling" refers to a process of selecting only those points that are seen in a current FOV because they are not obscured by other objects when viewed from the current position of the VR viewer. For example, if two adjacent points are on opposite sides of a wall, the point closest to the VR viewer will be selected since that point would be seen from the point of view of the VR viewer. In an embodiment, the CPU uses occlusion culling to select at most one point in the point cloud for each pixel in the VR viewer, and the point selected is a point that is closest to the current position of the VR viewer. This is contrasted with contemporary overdraw methods where all of the points in the point cloud within the FOV and within a selected distance of the current position of the VR viewer are selected. It should be appreciated that in a point cloud having a huge number of points, the contemporary overdraw method results in a selection of a large number of extraneous points. This in turn requires the contemporary methods to reduce the resolution (e.g. reduced point density) in order to maintain a desired frame rate (e.g. 90 frames per second) for the VR viewer.

In an embodiment, to avoid rendering artifacts occurring because of a change of the VR viewer position while not having the points on the GPU updated by the CPU renderer, selected points outside of the FOV of the VR viewer are retrieved by the CPU and stored in a buffer for use by the GPU.

In an embodiment, to further increase the performance of the CPU rendering, foveal rendering is used to provide higher resolution point data in the middle of the FOV and lower resolution point data at the edge and outside of the FOV.

Referring now to FIG. 1, a schematic illustration of a VR system 100 is generally shown in accordance with one or more embodiments of the present invention. The VR system 100 shown in FIG. 1 includes a three-dimensional (3D) scanner device 112 for measuring objects in a volume around the 3D scanner device 112. The scanner device 112 generates raw scan data, or a point cloud 104, that is made up a plurality of points. The point cloud 104 can be stored on a data storage device in a database or in any known data structure. In an embodiment, the 3D scanner device 112 is a metrology device such as, but not limited to, laser scanner 32 described below in reference to FIGS. 3-5. The 3D scanner device 112 is not limited to scanning devices and can be implemented by any known device that generates 3D point clouds such as, but not limited to a photogrammetry device, a triangulation scanner, an articulated arm coordinate measurement machine or a laser tracker.

Also shown in FIG. 1 is a CPU 102 for executing scan processing software that operates to retrieve points in the point cloud 104 for display on VR viewer 110. In an embodiment described herein, the scan processing software executed by the CPU 102 is SCENE™ manufactured by FARO Technologies, Inc. of Lake Mary Fla. Other CPU scan processing software that renders images from point clouds can also be utilized such as, but not limited to: 3DReshaper® manufactured by Technodigit; RealityCapture manufactured by Capturing Reality; and Bentley® Descartes™ manufactured by Bentley Systems, Inc. In addition, a programming API such as, but not limited to, OpenVR manufactured by Valve Corporation can be utilized.

The VR system 100 shown in FIG. 1 also includes a GPU 108 for executing GPU software for rendering images to the VR viewer 110. The GPU 108 renders images using points located in the subset of the point cloud 106 that correspond to a current position of the VR viewer 110. The GPU software can be implemented by any software capable of executing on a GPU to render images from point cloud data such as, but not limited to OpenGL® manufactured by Silicon Graphics International Corporation. In an embodiment, the GPU 108 also includes capacity to render triangle data and/or to perform post-processing calculations on the subset of the point cloud 106.

The VR viewer 110 shown in FIG. 1 can be implemented using any type of VR viewer known in the art such as, but not limited to headsets, goggles, smartphones, and other display devices. Examples of commercially available VR viewers that can be utilized include, but are not limited to VR headsets such as the HTC Vive™ and the Oculus Rift®. As used herein, the term "position of the VR viewer" refers to a location (e.g., a 3D point) in a scene represented by the cloud data and a direction in space, or orientation, that a user of the VR viewer at that location is facing. This is contrasted with the term "field-of-view" or "FOV" which is used herein to refer to a portion of the scene that the user of the VR viewer can see through the VR viewer when the VR viewer is at a particular position. The position of the VR viewer can be changed using a variety of tools such as, but not limited to controllers, hand trackers, VR viewer movement detectors, voice commands, and eye tracking depending on the particular VR viewer being implemented.

The elements shown in FIG. 1 can be implemented as separate physical units as shown in FIG. 1 or they can be combined into one or more integrated units. For example, the CPU 102 and the GPU 108 may be portions of the same multi-core computer system. In another example, the GPU 108 may be located on the VR viewer 110.

Figure 2:
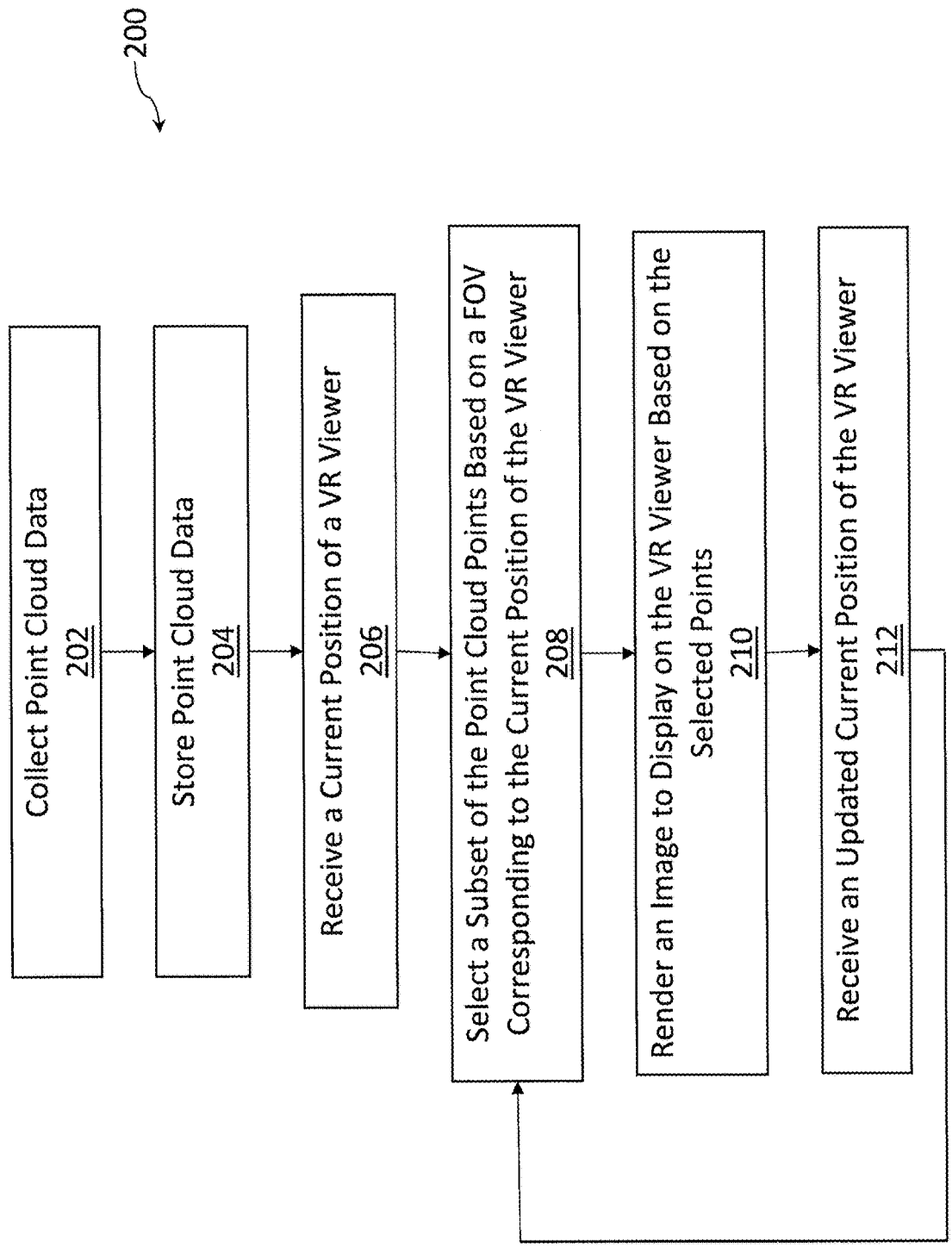
FIG. 2 is a flow diagram illustrating a method of operating the VR system in accordance with one or more embodiments of the present invention.

Referring now to FIG. 2, a flow diagram 200 illustrating a method of operating the VR system 100 shown in FIG. 1 is generally shown in accordance with one or more embodiments of the present invention. At block 202, the 3D scanner device 112 creates a point cloud 104 by measuring objects in a volume around the 3D scanner device 112 and recording 3D coordinates, or points. The points that make up the point cloud 104 describe the objects in the volume around the 3D scanner. At block 204, the point cloud 104 is stored in a data storage device. At block 206, a current position of the VR viewer 110 is received and at block 208, scan processing software executing on the CPU 102 selects points in the subset of the point cloud 106 based at least in part on a FOV of the VR viewer 110 that corresponds to the current position of the VR viewer 110. In an embodiment, the CPU uses occlusion culling to select at most one point for each pixel in the VR viewer 110. At block 210, the GPU 108 renders an image to display on the VR viewer 110 using the selected points in the subset of the point cloud 106. At block 212, an updated current position of the VR viewer 110 is received and processing continues at block 208.

In an embodiment, the current position of the VR viewer 110 is monitored for changes (e.g., by CPU 102) and the processing at blocks 208-210 performed in response to detecting a change in the current position of the VR viewer 110. In an embodiment, the current position of the VR viewer 110 is determined on a periodic or aperiodic basis in addition to or instead of the monitoring. Blocks 208-212 are repeated until the VR system 100 is no longer being used (e.g., the VR viewer 110 is powered off, the user has indicated that the VR viewing has ended, the GPU 108 is powered off).

Figure 3:
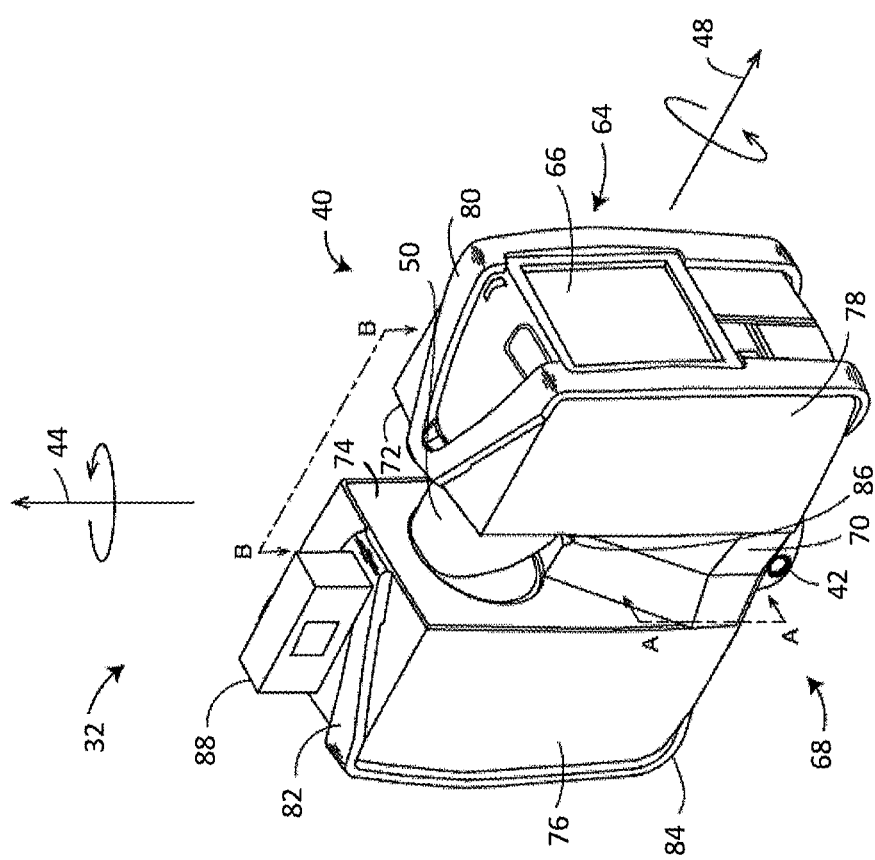
FIG. 3 is a perspective view of a laser scanner in accordance with one or more embodiments of the present invention.
Figure 4:
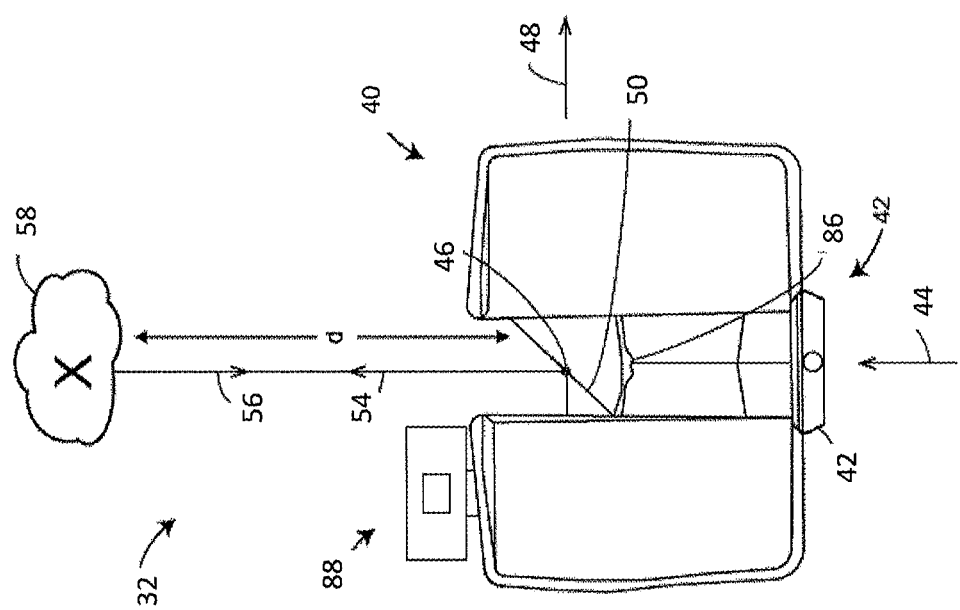
FIG. 4 is a side view of the laser scanner illustrating a method of measurement in accordance with one or more embodiments of the present invention
Figure 5:
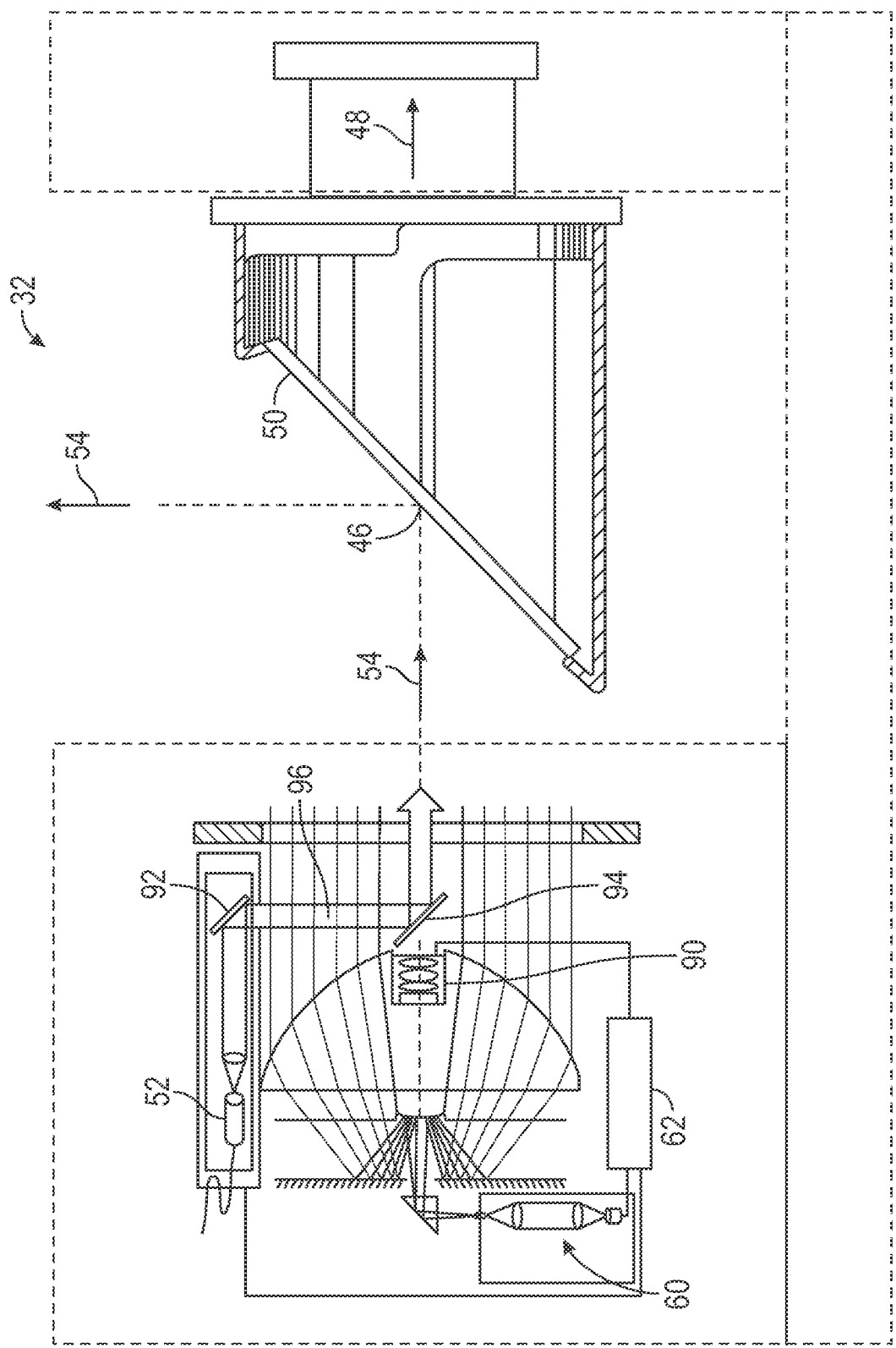
FIG. 5 is a schematic illustration partially in section along the line B-B of FIG. 3 of the optical, mechanical, and electrical components of the laser scanner in accordance with one or more embodiments of the present invention.

Referring now to FIGS. 3-5, a laser scanner 32 is shown for optically scanning and measuring the environment surrounding the laser scanner 32. The laser scanner 32 has a measuring head 40 and a base 42. The measuring head 40 is mounted on the base 42 such that the laser scanner 32 may be rotated about a vertical axis 44. In one embodiment, the measuring head 40 includes a gimbal point 46 that is a center of rotation about the vertical axis 44 and a horizontal axis 48. The measuring head 40 has a rotary mirror 50, which may be rotated about the horizontal axis 48. The rotation about the vertical axis may be about the center of the base 42. The terms vertical axis and horizontal axis refer to the scanner in its normal upright position. In other words, with the axis 44 extending approximately perpendicular to the floor or ground and the axis 48 being approximately parallel with the floor or ground. It should be appreciated that it is also possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative nomenclature for the vertical axis.

The measuring head 40 is further provided with an electromagnetic radiation emitter, such as light emitter 52, for example, that emits an emitted light beam 54. In one embodiment, the emitted light beam 54 is a coherent light beam such as a laser beam. The laser beam may have a wavelength range of approximately 300 to 1600 nanometers, for example 790 nanometers, 905 nanometers, 1550 nanometers, or less than 400 nanometers. It should be appreciated that other electromagnetic radiation beams having greater or smaller wavelengths may also be used. The emitted light beam 54 may be amplitude or intensity modulated, for example, with a sinusoidal waveform or with a rectangular waveform. The emitted light beam 54 is emitted by the light emitter 52 onto the rotary mirror 50, where it is deflected to the environment. A reflected light beam 56 is reflected from the environment by an object 58. The reflected or scattered light is intercepted by the rotary mirror 50 and directed into a light receiver 60. The directions of the emitted light beam 54 and the reflected light beam 56 result from the angular positions of the rotary mirror 50 and the measuring head 40 about the axes 44, 48 respectively. These angular positions in turn depend on the corresponding rotary drives or motors.

Coupled to the light emitter 52 and the light receiver 60 is a 3D scanner processor, or controller 62. The controller 62 determines, for a multitude of measuring points X, a corresponding number of distances d between the laser scanner 32 and the points X on object 58. The distance to a particular point X is determined (e.g., by a distance meter implemented by the controller 62) based at least in part on the speed of light in air through which electromagnetic radiation propagates from the device to the object point X. In one embodiment the phase shift of modulation in light emitted by the laser scanner 32 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the TOF of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 about axis 25 relatively quickly while rotating the measuring head 22 about axis 23 relatively slowly, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system. In addition to measuring a distance d from the gimbal point 46 to an object point X, the laser scanner 32 may also collect gray-scale information related to the received optical power (equivalent to the term "brightness.") The gray-scale value may be determined at least in part, for example, by integration of the bandpass-filtered and amplified signal in the light receiver 60 over a measuring period attributed to the object point X.

The measuring head 40 may include a display device 64 integrated into the laser scanner 32. The display device 64 may include a graphical touch screen 66, as shown in FIG. 3, which allows the operator to set the parameters or initiate the operation of the laser scanner 32. For example, the screen 66 may have a user interface that allows the operator to provide measurement instructions to the device, and the screen may also display measurement results.

The laser scanner 32 includes a carrying structure 68 that provides a frame for the measuring head 40 and a platform for attaching the components of the laser scanner 32. In one embodiment, the carrying structure 68 is made from a metal such as aluminum. The carrying structure 68 includes a traverse member 70 having a pair of walls 72, 74 on opposing ends. The walls 72, 74 are parallel to each other and extend in a direction opposite the base 42. Shells 76, 78 are coupled to the walls 72, 74 and cover the components of the laser scanner 32. In the exemplary embodiment, the shells 76, 78 are made from a plastic material, such as polycarbonate or polyethylene for example. The shells 76, 78 cooperate with the walls 72, 74 to form a housing for the laser scanner 32.

On an end of the shells 76, 78 opposite the walls 72, 74 a pair of yokes 80, 82 are arranged to partially cover the respective shells 76, 78. In the exemplary embodiment, the yokes 80, 82 are made from a suitably durable material, such as aluminum for example, that assists in protecting the shells 76, 78 during transport and operation. The yokes 80, 82 each includes a first arm portion 84 that is coupled, such as with a fastener for example, to the traverse 70 adjacent the base 42. The arm portion 84 for each yoke 80, 82 extends from the traverse 70 obliquely to an outer corner of the respective shell 76, 78. From the outer corner of the shell, the yokes 80, 82 extend along the side edge of the shell to an opposite outer corner of the shell. Each yoke 80, 82 further includes a second arm portion that extends obliquely to the walls 72, 74. It should be appreciated that the yokes 80, 82 may be coupled to the traverse 70, the walls 72, 74 and the shells 76, 78 at multiple locations.

The pair of yokes 80, 82 cooperate to circumscribe a convex space within which the two shells 76, 78 are arranged. In the exemplary embodiment, the yokes 80, 82 cooperate to cover all of the outer edges of the shells 76, 78, while the top and bottom arm portions project over at least a portion of the top and bottom edges of the shells 76, 78. This provides advantages in protecting the shells 76, 78 and the measuring head 40 from damage during transportation and operation. In other embodiments, the yokes 80, 82 may include additional features, such as handles to facilitate the carrying of the laser scanner 32 or attachment points for accessories for example.

On top of the traverse 70, a prism 86 is provided. The prism 86 extends parallel to the walls 72, 74. In the exemplary embodiment, the prism 86 is integrally formed as part of the carrying structure 68. In other embodiments, the prism 86 is a separate component that is coupled to the traverse 70. When the mirror 50 rotates, during each rotation the mirror 50 directs the emitted light beam 54 onto the traverse 70 and the prism 86. Due to non-linearities in the electronic components, for example in the light receiver 60, the measured distances d may depend on signal strength, which may be measured in optical power entering the scanner or optical power entering optical detectors within the light receiver 56, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 60. Since the prism 86 is at a known distance from the gimbal point 46, the measured optical power level of light reflected by the prism 86 may be used to correct distance measurements for other measured points, thereby allowing for compensation to correct for the effects of environmental variables such as temperature. In the exemplary embodiment, the resulting correction of distance is performed by the controller 62.

In an embodiment, the controller 62 represents one or more processors distributed throughout the scanner 32 or external to the scanner 32. The one or more processor may include one or more computing devices connected for communications via a network. The computing devices may be arranged in a distributed arrangement to operate cooperatively to process data from the scanner 32. The processors may be microprocessors, field programmable gate arrays (FPGAs), digital signal processors (DSPs), and generally any device capable of performing computing functions. The one or more processors have access to memory (volatile or nonvolatile) for storing information. In addition, one or more of the processors of the controller 62 may provide support for remote computing capability. Communication between the processors may be through a wired, wireless, or a combination of wired and wireless data connection or medium.

In an embodiment, the base 42 is coupled to a swivel assembly (not shown) such as that described in commonly owned U.S. Pat. No. 8,705,012 ('012), which is incorporated by reference herein. The swivel assembly is housed within the carrying structure 68 and includes a motor that is configured to rotate the measurement head 40 about the axis 44.

An auxiliary image acquisition device 88 may be a device that captures and measures a parameter associated with the scanned volume or the scanned object and provides a signal representing the measured quantities over an image acquisition area. The auxiliary image acquisition device 88 may be, but is not limited to, a color camera, pyrometer, a thermal imager, an ionizing radiation detector, or a millimeter-wave detector.

In an embodiment, a camera (first image acquisition device) 90 is located internally to the scanner 32 and may have the same optical axis as the 3D scanner device. In this embodiment, the first image acquisition device 90 is integrated into the measuring head 40 and arranged to acquire images along the same optical pathway as emitted light beam 54 and reflected light beam 56. In this embodiment, the light from the light emitter 52 reflects off a fixed mirror 92 and travels to dichroic beam-splitter 94 that reflects the light 96 from the light emitter 52 onto the rotary mirror 50. The dichroic beam-splitter 94 allows light to pass through at wavelengths different than the wavelength of light 96. For example, the light emitter 52 may be a near infrared laser light (for example, light at wavelengths of 780 nm or 1150 nm), with the dichroic beam-splitter 94 configured to reflect the infrared laser light while allowing visible light (e.g., wavelengths of 400 to 700 nm) to transmit through. In other embodiments, the determination of whether the light passes through the beam-splitter 94 or is reflected depends on the polarization of the light. The digital camera 90 acquires 2D photographic images of the scanned area to capture color data (texture) to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 44 and by steering the mirror 50 about the axis 48.

Figure 6:
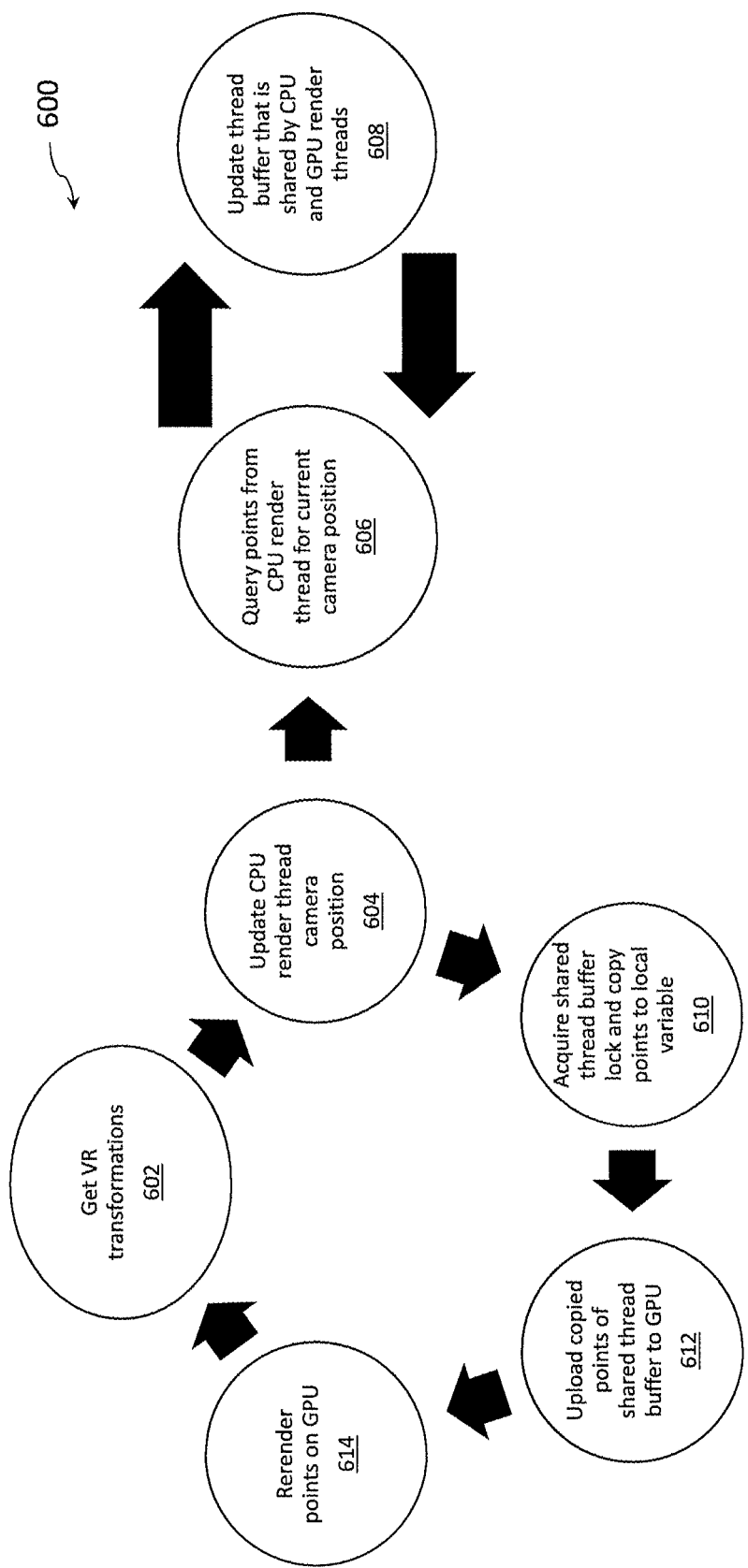
FIG. 6 is a schematic illustration flow diagram illustrating a method of providing data to a VR viewer in accordance with one or more embodiments of the present invention.

Referring now to FIG. 6, a flow diagram 600 illustrating a method of providing data to a VR viewer (e.g., VR viewer 110 in FIG. 1) is generally shown in accordance with one or more embodiments of the present invention. In an embodiment, blocks 610, 612, and 614 of FIG. 6 are executed by a GPU render thread executing on a GPU (e.g., GPU 108 in FIG. 1), and blocks 602, 604, 606, and 608 of FIG. 6 are executed by a CPU render thread executing on a CPU (e.g., CPU 102 in FIG. 1). As used herein, the term "render thread" is used to refer to a scan processing software program executing to generate an image on a VR viewer using points in a point cloud. In an embodiment, the CPU and GPU render threads both have access to a shared thread buffer (e.g., subset of the point cloud 106 in FIG. 1) that includes a subset of points in a point cloud (e.g., point cloud 104 in FIG. 1). In an embodiment, the shared buffer includes three buffers, one buffer being read by the GPU to provide a left eye image, another buffer being read by the GPU to provide a right eye image, and another buffer being written to by the CPU with points for either a right or left eye image. At any point in time, a buffer is either being read by the GPU or written to by the CPU, not both. In an embodiment, SCENE from FARO Technologies, Inc. of Lake Mary Fla. is utilized to perform the functions of the CPU render thread and OpenGL is utilized to perform the functions of the GPU render thread.

Turning now to FIG. 6, at block 602, the current position of the VR viewer is obtained by the CPU render thread. In an embodiment, at block 602, the CPU render thread translates signals indicating movement from the VR viewer into a current position of the viewer that includes a location and orientation in the point cloud. At block 604, the current position of the VR viewer is transformed into a camera position, or FOV, of the VR viewer. If the CPU thread starts querying a certain subset of points from the point cloud, the latest camera position is used for the query as the update rate of setting the camera position is at about 90 fps and the CPU thread queries subset of points at a lower rate. At block 606, the CPU render thread, using occlusion culling, selects points from a point cloud, such as point cloud 104, based on the updated camera position and stores them in a buffer in the shared thread buffer at block 608. In an embodiment, the CPU switches back and forth between writing points to a buffer for a left eye image and writing points to a buffer for a right eye image. In an embodiment, the CPU uses a lookup algorithm or a search algorithm to select the right subset of points in the octree based data structure.

At block 610, the GPU render thread accesses the stored points in the shared thread buffer and copies them to a local variable. In an embodiment, this includes replacing one of the buffers being read by the GPU with the buffer that the CPU has finished writing. For example, the buffer being read by the GPU that includes the left eye image may be replaced by the buffer written to by the CPU when it includes a left eye image, or alternatively, the buffer being read by the GPU that includes the right eye image may be replaced by the buffer written to by the CPU when it includes a right eye image. The replaced buffer then becomes the buffer being written to by the CPU with the next group of points. At block 612, the copied points from the shared thread buffer are uploaded and rendered on the GPU at block 614 for viewing on the VR viewer. As shown in FIG. 6, the process of determining a current position of a VR viewer and providing a subset of data points corresponding to the current position to the GPU for rendering to the VR viewer is repeated until, for example, the VR viewer is powered off.

In an embodiment, the CPU render thread selects points for the shared thread buffer that include camera positions for both eyes. In an embodiment, the CPU render thread queries points in a loop and at the end of the loop, the shared thread buffer is updated. In one loop iteration a point for the left eye is added to the shared thread buffer, and in the next loop iteration a point for the right eye is added to the shared thread buffer. This method adding points cuts latency in half when compared with providing points for both eyes in each iteration.

In an embodiment, local variables of the GPU render thread include three point buffers: one for the left eye, one for the right eye, and an unused buffer that contains a list of points that have not been uploaded to the GPU. In an embodiment, the GPU render thread queries the shared thread buffer to determine if new points are available, and when they are available, the GPU render thread copies them into the unused buffer. The GPU render thread renders an image from the buffers for each eye but does not render an image from contents of the unused buffer. The three point buffers are used to provide non-blocking point streaming to the GPU.

Figure 7:
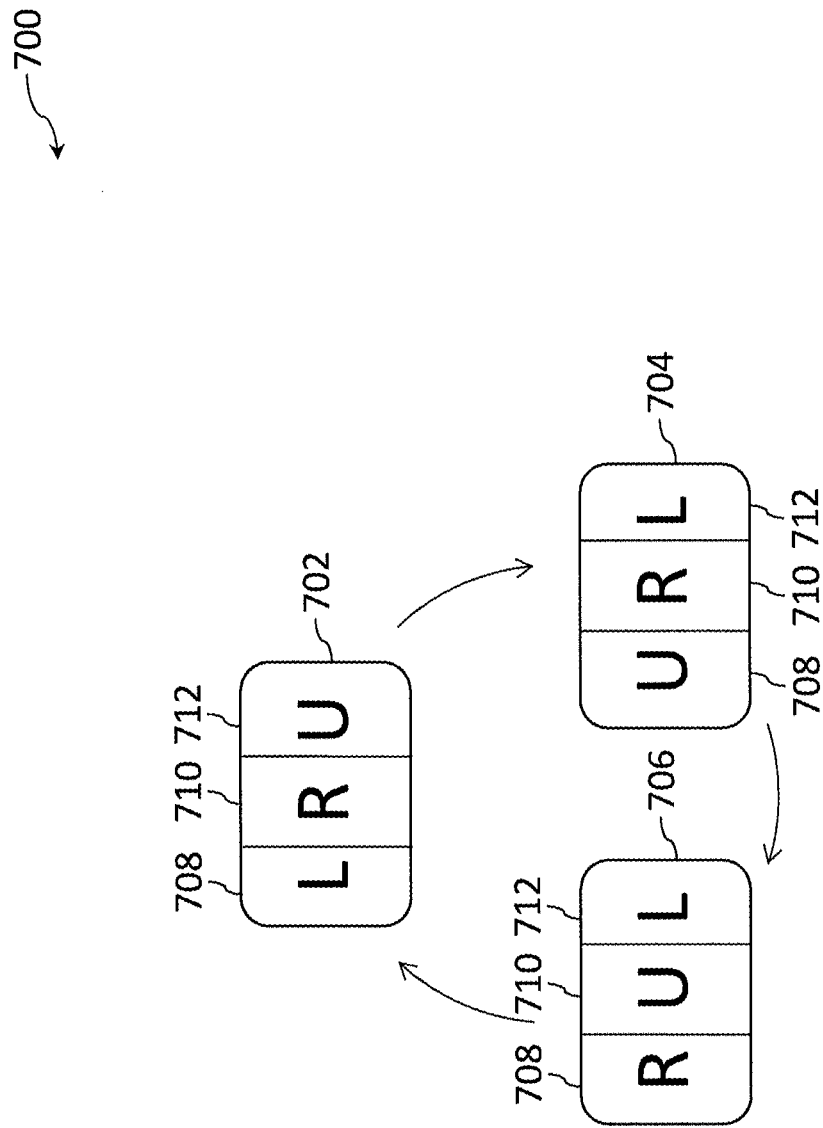
FIG. 7 is a schematic illustration of buffers utilized by a graphics processing unit (GPU) in the VR system in accordance with one or more embodiments of the present invention.

Referring now to FIG. 7, a schematic illustration 700 of point buffers utilized by a GPU in the VR system to provide non-blocking point streaming to the GPU is generally shown in accordance with one or more embodiments of the present invention. In an embodiment, the buffers shown in FIG. 7 are located in the subset of the point cloud 106 shown in FIG. 1. In an embodiment, such as that shown in FIG. 7, the three buffers are rotated in a ring buffer manner and as soon as the unused buffer is fully uploaded, the oldest eye buffer is replaced with the unused buffer for rendering points on the GPU. As shown in FIG. 7, at a first time 702, buffer 708 contains points read by the GPU to render a left eye image, buffer 710 contains points read by the GPU to render a right eye image, and buffer 712 is unused by the GPU but being written to by the CPU with points representing a left eye image. At a second time 704, buffer 708 is unused by the GPU but being written to by the CPU with points representing a right eye image, buffer 710 contains points read by the GPU to render a right eye image, and buffer 712 contains points read by the GPU to render a left eye image. At a third time 706, buffer 708 contains points read by the GPU to render a right eye image, buffer 710 is unused by the GPU but being written to by the CPU with points representing a right image, and buffer 712 contains points read by the GPU to render a left eye image.

In an embodiment, in order to avoid FPS drop, a subset of the points are uploaded in each frame until the points are fully uploaded.

Figure 8:
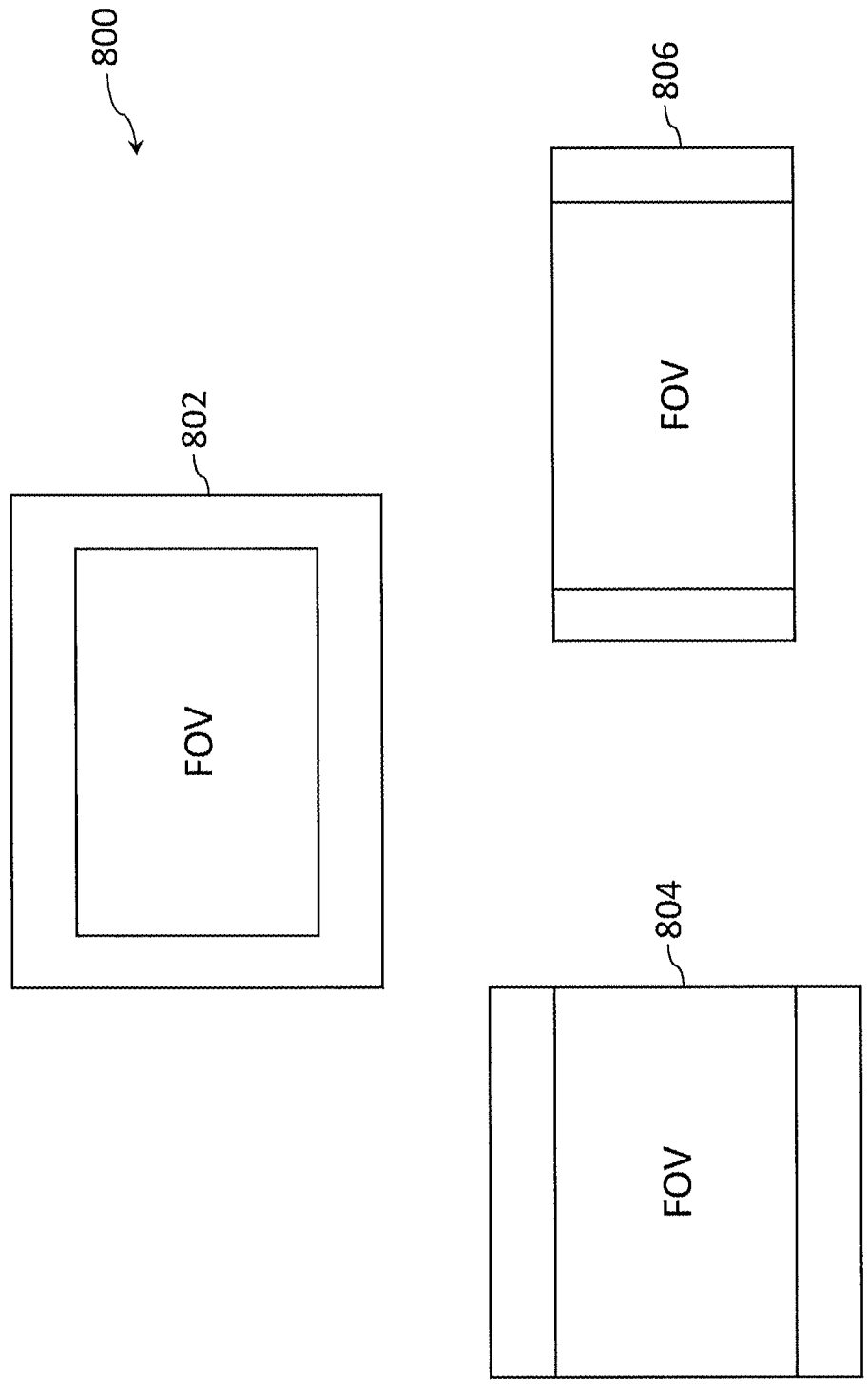
FIG. 8 is a schematic illustration of expanded FOVs in accordance with one or more embodiments of the present invention.

Referring now to FIG. 8, schematic illustrations 800 of expanded FOVs are generally shown in accordance with one or more embodiments of the present invention. To account for the difference in rendering speed between the CPU and the GPU, an embodiment retrieves points from the point cloud corresponding to an image with a FOV that is much wider and/or higher than the current FOV of the VR viewer. In this manner, when the FOV of the VR viewer moves, points for rendering an image for the updated FOV are available even though the CPU render thread may not be finished selecting points for the new camera perspective. In an embodiment, a typical render resolution of about one thousand points by one thousand points is utilized by a FOV. This is contrasted with an embodiment where a render resolution of about three thousand points by three thousand points is utilized by the expanded FOV. Block 802 depicts an expanded FOV image that expands the current FOV of a VR viewer in both a vertical and horizontal direction. Block 804 depicts an expanded FOV image that expands the current FOV of a VR viewer in a vertical direction. Block 806 depicts an expanded FOV image that expands the current FOV of a VR viewer in a horizontal direction.

In an embodiment, the FOV of a VR viewer is expanded based on past movement of the FOV. For example, if the last few movements of the FOV are to the left, the CPU may expand the FOV further on the left side than on the right side of the FOV.

In an embodiment, the size of the expanded FOV can be adjusted based on the difference in rendering speed between the CPU and the GPU.

Figure 9:
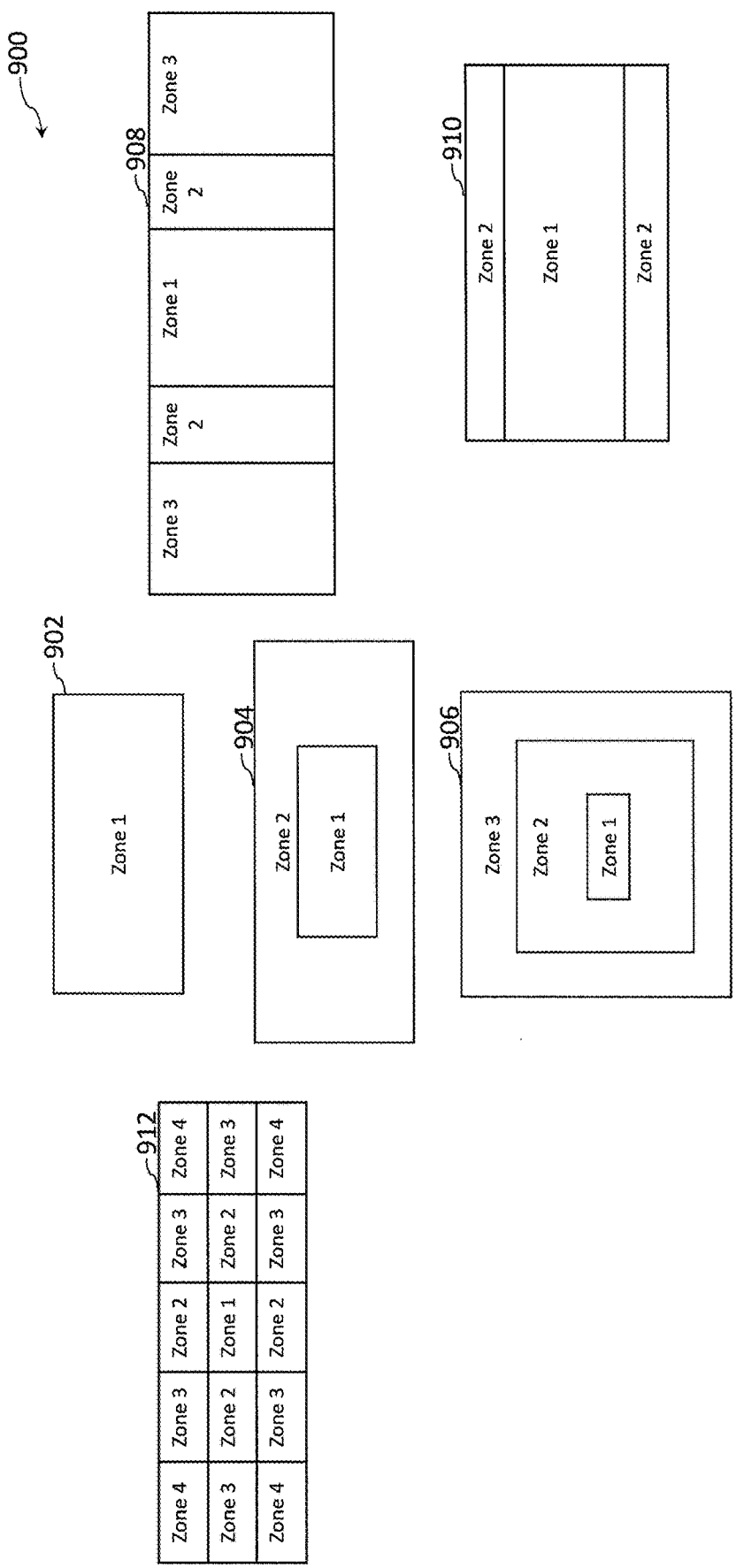
FIG. 9 is a schematic illustration of one or more zones within a field-of-view (FOV) in accordance with one or more embodiments of the present invention.

The expanded FOV can have an adverse impact on the rendering speed of the CPU, or the FPS rate, because it requires more points to be selected for each FOV. In an embodiment, foveal rendering is used to decrease the number of points required by providing high resolution in the middle of the image and low resolution at the edges of the image. The FOV can be broken up into various zones that each correspond to different point densities, or resolutions. Referring now to FIG. 9, schematic illustrations 900 of one or more zones within FOVs are generally shown in accordance with one or more embodiments of the present invention. FIG. 9 shows a variety of configurations that can be implemented to vary the resolution of an image within an FOV. Block 902 shows a FOV with a single zone, block 904 two zones, block 906 three zones, block 908 zones that vary in a horizontal direction, block 910 zones that vary in a vertical direction, and block 912 zones that vary based on grids In foveal rendering each point has a certain point size in pixels. The size can either be stored on a per point basis or per zone basis for zones in which points reside in. Points at the outer areas of the subset of points on the GPU are rendered with a larger point size to make sure the user always has the impression of a dense surface where there is one within the full point data set when he sees these low resolution points. The point size of a point in a certain subset is not influenced by a different FOV in the GPU thread.

In an embodiment, the resolution, configuration, number of zones and/or size of zones can be adjusted based on the size of the expanded FOV and/or the difference in rendering speed between the CPU and the GPU.

In an embodiment, supersampling, where the image is rendered at two times the resolution (e.g., 2800×2800 instead of 1400×1400) is utilized to reduce image noise in the VR viewer caused by micro-movements. In other embodiments, four or eight or some other multiple is utilized. Afterwards, the image can be scaled down to the original resolution before displaying. The downscaling algorithm can differ substantially between different implementations and can be implemented using an averaging algorithm.

In an embodiment, image blurring, where the colors of a specified number (e.g., 4) pixels are averaged is utilized to reduce image noise caused by micro-movements.

The term "about" is intended to include the degree of error associated with measurement of the particular quantity based upon the equipment available at the time of filing the application. For example, "about" can include a range of ±8% or 5%, or 2% of a given value.

Figure 10:
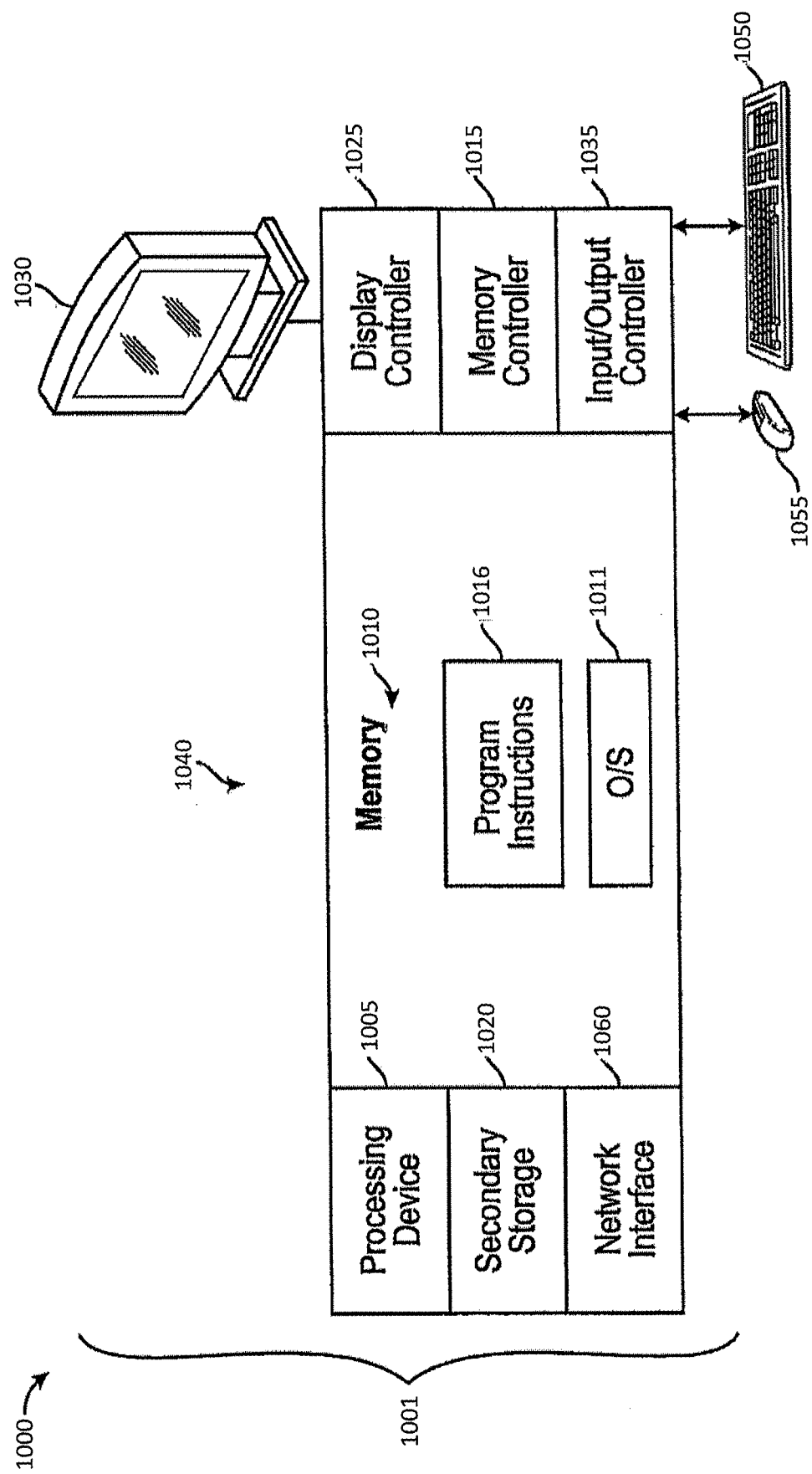
FIG. 10 is a schematic illustration of a computer system in accordance with one or more embodiments.

Turning now to FIG. 10, a schematic illustration of a system 1000 is depicted upon which one or more embodiments of a VR system for viewing point cloud volumes while maintaining a high point cloud resolution may be implemented. In an embodiment, all or a portion of the system 1000 may be incorporated into one or more of the 3D scanner device, the CPU, and the GPU described herein. In one or more exemplary embodiments, in terms of hardware architecture, as shown in FIG. 10, the computer 1001 includes a processing device 1005 and a memory 1010 coupled to a memory controller 1015 and an input/output controller 1035. The input/output controller 1035 can be, for example, but not limited to, one or more buses or other wired or wireless connections, as is known in the art. The input/output controller 1035 may have additional elements, which are omitted for simplicity, such as controllers, buffers (caches), drivers, repeaters, and receivers, to enable communications. Further, the computer 1001 may include address, control, and/or data connections to enable appropriate communications among the aforementioned components.

In one or more exemplary embodiments, a keyboard 1050 and mouse 1055 or similar devices can be coupled to the input/output controller 1035. Alternatively, input may be received via a touch-sensitive or motion sensitive interface (not depicted). The computer 1001 can further include a display controller 1025 coupled to a display 1030. It should be appreciated that the VR viewer (e.g., VR viewer 110 of FIG. 1) may be coupled to the system 1000.

The processing device 1005 is a hardware device for executing software, particularly software stored in secondary storage 1020 or memory 1010. The processing device 1005 can be any custom made or commercially available computer processor, a central processing unit (CPU), an auxiliary processor among several processors associated with the computer 1001, a semiconductor-based microprocessor (in the form of a microchip or chip set), a macroprocessor, or generally any device for executing instructions.

The memory 1010 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), flash memory, programmable read only memory (PROM), tape, compact disc read only memory (CD-ROM), flash drive, disk, hard disk drive, diskette, cartridge, cassette or the like, etc.). Moreover, the memory 1010 may incorporate electronic, magnetic, optical, and/or other types of storage media. Accordingly, the memory 1010 is an example of a tangible computer readable storage medium 1040 upon which instructions executable by the processing device 1005 may be embodied as a computer program product. The memory 1010 can have a distributed architecture, where various components are situated remote from one another, but can be accessed by the processing device 1005.

The instructions in memory 1010 may include one or more separate programs, each of which comprises an ordered listing of executable instructions for implementing logical functions. In the example of FIG. 10, the instructions in the memory 1010 include a suitable operating system (OS) 1011 and program instructions 1016. The operating system 1011 essentially controls the execution of other computer programs and provides scheduling, input-output control, file and data management, memory management, and communication control and related services. When the computer 1001 is in operation, the processing device 1005 is configured to execute instructions stored within the memory 1010, to communicate data to and from the memory 1010, and to generally control operations of the computer 1001 pursuant to the instructions. Examples of program instructions 1016 can include instructions to implement the processing described herein in reference to FIGS. 1-9.

The computer 1001 of FIG. 10 also includes a network interface 1060 that can establish communication channels with one or more other computer systems via one or more network links. The network interface 1060 can support wired and/or wireless communication protocols known in the art. For example, when embodied in a user system, the network interface 1060 can establish communication channels with an application server.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In one aspect, the computer readable storage medium may be a tangible medium containing or storing a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The computer readable medium may contain program code embodied thereon, which may be transmitted using any appropriate medium, including but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

It will be appreciated that aspects of the present invention are described herein with reference to flowchart illustrations and/or block diagrams of methods, apparatus (systems) and computer program products according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed general purpose computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, GPU devices, computing devices, microcontrollers, digital signal processors, or like devices, as further described herein. A CPU typically performs a variety of tasks while a GPU is optimized to display images.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

What is claimed is:

1. A virtual reality (VR) system comprising:
a three-dimensional (3D) point cloud comprising a plurality of points;
a VR viewer having a current position;
a graphics processing unit (GPU) coupled to the VR viewer; and
a central processing unit (CPU) coupled to the VR viewer, the CPU responsive to first executable instructions that when executed on the CPU perform a first method comprising determining a field-of-view (FOV) based at least in part on the current position of the VR viewer, selecting a subset of the plurality of points using occlusion culling and based at least in part on the FOV, and providing the subset of the plurality of points to the GPU, wherein the GPU is responsive to second executable computer instructions that when executed on the GPU perform a second method comprising receiving the subset of the plurality of points from the CPU and rendering an image for display on the VR viewer based at least in part on the received subset of the plurality of points, wherein the selecting the subset of the plurality of points is at a first frame per second (FPS) rate and the rendering is at a second FPS rate that is faster than the first FPS rate.

2. The system of claim 1, wherein the determining, selecting, providing, receiving, and rendering are performed periodically.

3. The system of claim 1, wherein the first method further comprises monitoring the current position of the VR viewer and the determining, selecting, providing, receiving, and rendering are performed based at least in part on determining, based on the monitoring, that the current position of the VR viewer has changed.

4. The system of claim 1, wherein the providing the subset of the plurality of points to the GPU comprises storing the subset of the plurality of points to a shared storage location accessible by the GPU and the CPU, and wherein the receiving the subset of the plurality of points comprises accessing the shared storage location.

5. The system of claim 1, wherein the first FPS rate is about ten FPS and the second FPS rate is about ninety FPS.

6. The system of claim 1, further comprising a laser scanner for capturing the plurality of points.

7. The system of claim 1, wherein the subset of the plurality of points is characterized by a plurality of different densities including first points for display at a first density at a first location in the FOV and second points for display at a second density at a second location in the FOV.

8. The system of claim 1, wherein the subset of the plurality of points includes points outside of the FOV.

9. The system of claim 1, wherein the VR viewer is a headset.

10. The system of claim 1, wherein the VR viewer is a smartphone VR viewer.

11. A method comprising:
providing a virtual reality (VR) system comprising a three-dimensional (3D) point cloud comprising a plurality of points, a central processing unit (CPU), a VR viewer having a current position, and a graphics processing unit (GPU), the VR viewer coupled to the CPU and to the GPU;
determining, at the CPU, a field-of-view (FOV) based at least in part on the current position of the VR viewer;
selecting, at the CPU, a subset of the plurality of points in the 3D point cloud, the selecting using occlusion culling and based at least in part on the FOV, wherein the occlusion culling comprises selecting at most one point in the 3D point cloud for each pixel in the VR viewer, wherein the selected at most one point is a point that is closest to the current position of the VR viewer;
providing, by the CPU, the subset of the plurality of points to the GPU;
receiving, at the GPU, the subset of the plurality of points from the CPU; and
rendering, at the GPU, an image for display on the VR viewer, the rendering based at least in part on the received subset of the plurality of points,
wherein the selecting is at first frame per second (FPS) rate and the rendering is at a second FPS rate that is faster than the first FPS rate.

12. The method of claim 11, further comprising repeating the determining, selecting, providing, receiving, and rendering periodically.

13. The method of claim 11 further comprising:
monitoring, by the CPU, the current position of the VR viewer; and
repeating the determining, selecting, providing, receiving, and rendering based at least in part on determining, based on the monitoring, that the current position of the VR viewer has changed.

14. The method of claim 11, wherein the providing the subset of the plurality of points to the GPU comprises storing the subset of the plurality of points to a shared storage location accessible by the GPU and the CPU, and wherein the receiving the subset of the plurality of points comprises accessing the shared storage location.

15. The method of claim 11, wherein the first FPS rate is about ten FPS and the second FPS rate is about ninety FPS.

16. The method of claim 11, wherein a laser scanner captures the plurality of points.

17. The method of claim 11, wherein the subset of the plurality of points is characterized by a plurality of different densities including first points for display at a first density at a first location in the FOV and second points for display at a second density at a second location in the FOV.

18. The method of claim 11, wherein the subset of the plurality of points includes points outside of the FOV.

19. A computer program product comprising a non-transitory computer readable storage medium having program instructions embodied therewith, the program instructions:
determining, at a central processing unit (CPU), a field-of-view (FOV) based at least in part on a current position of a VR viewer;
providing a graphics processing unit (GPU) coupled to the VR viewer;
selecting, at the CPU, a subset of a plurality of points in a three-dimensional (3D) point cloud, the selecting using occlusion culling and based at least in part on the FOV, the selecting further based at least in part on foveal rendering to provide higher resolution point cloud data in a middle of the FOV and lower resolution point cloud data at an edge of the FOV and an outside of the FOV;
providing, by the CPU, the subset of the plurality of points to the GPU;
receiving, at the GPU, the subset of the plurality of points from the CPU; and
rendering, at the GPU, an image for display on the VR viewer, the rendering based at least in part on the received subset of the plurality of points,
wherein the selecting is at first frame per second (FPS) rate and the rendering is at a second FPS rate that is faster than the first FPS rate.

20. The computer program product of claim 19, wherein one or both of:
the subset of the plurality of points is characterized by a plurality of different densities including first points for display at a first density at a first location in the FOV and second points for display at a second density at a second location in the FOV; and
the subset of the plurality of points includes points outside of the FOV.

* * * * *